(12) United States Patent
Illig

(10) Patent No.: US 9,018,504 B2
(45) Date of Patent: Apr. 28, 2015

(54) TINA ILLIG METHOD FOR GOOD PIANO SIGHT READING

(71) Applicant: Celestina Rose Illig, Ebensburg, PA (US)

(72) Inventor: Celestina Rose Illig, Ebensburg, PA (US)

( * ) Notice: Subject to any disclaimer, the term of this patent is extended or adjusted under 35 U.S.C. 154(b) by 71 days.

(21) Appl. No.: 13/865,304

(22) Filed: Apr. 18, 2013

(65) Prior Publication Data
US 2014/0311321 A1    Oct. 23, 2014

(51) Int. Cl.
*G09B 15/06*    (2006.01)
*G09B 15/02*    (2006.01)

(52) U.S. Cl.
CPC ..................................... *G09B 15/02* (2013.01)

(58) Field of Classification Search
USPC ........................................................ 84/470 R
See application file for complete search history.

(56) References Cited

U.S. PATENT DOCUMENTS

| | | | | |
|---|---|---|---|---|
| 1,844,976 A * | 2/1932 | Rantz | .............................. | 84/478 |
| 7,453,036 B1 * | 11/2008 | Henkel | ........................ | 84/483.2 |
| 7,629,527 B2 * | 12/2009 | Hiner et al. | ................. | 84/470 R |
| 8,039,721 B2 * | 10/2011 | Wold | .......................... | 84/470 R |
| 2012/0135789 A1 * | 5/2012 | Feidner | ............................. | 463/7 |

* cited by examiner

*Primary Examiner* — Christopher Uhlir

(57) ABSTRACT

The purpose of my invention/method is to create good keyboard sight reading musicians. By marking skips between notes according to the method set forth in my detailed description and then playing them on the keyboard, the musician is able to develop good sight reading skills. The difference between my method and others is that my method uses letter names of notes only to find the beginning location of a piece of music and this is done through the use of a note/keyboard chart. All other reading is done by use of spacing and direction through recognition of skips on the staff. It is essential to the success of my method that letter names NOT be used because they interfere with the spatial and directional understanding of notes needed to sight read well. My method is useful at all levels because it is structured, concrete, and cumulative.

3 Claims, 15 Drawing Sheets

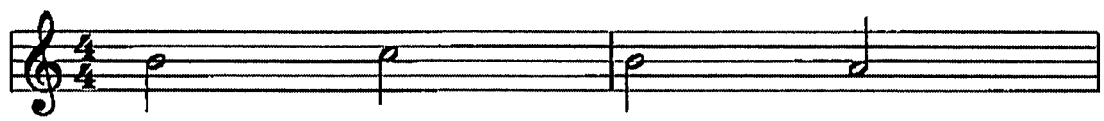
FIG. 1A
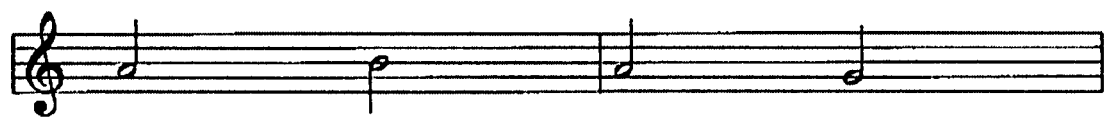
FIG. 1B
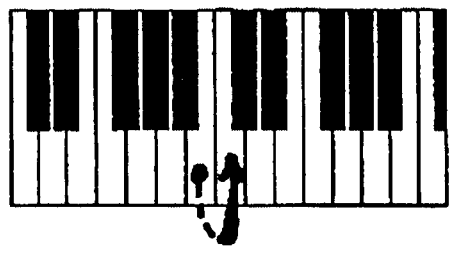 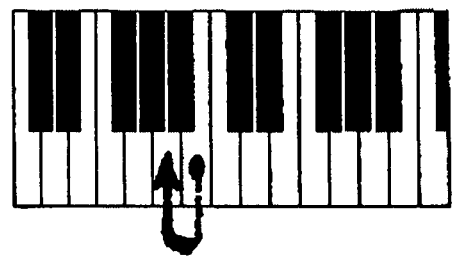
FIG. 1C  FIG. 1D

FIG. 2A
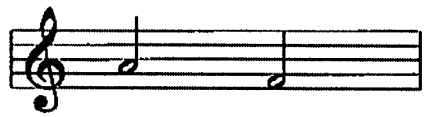
FIG. 2B
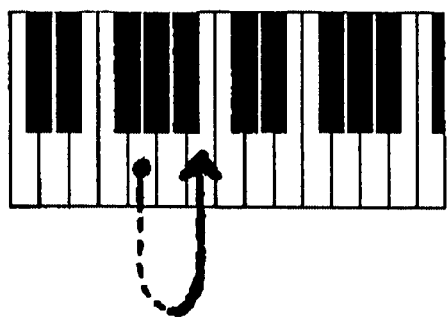     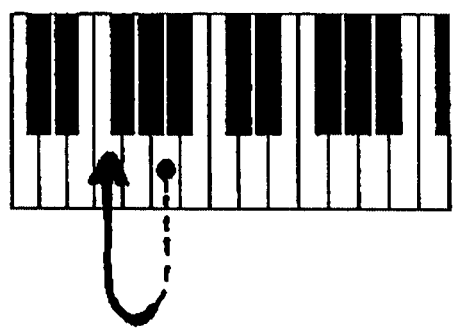
FIG. 2C              FIG. 2D

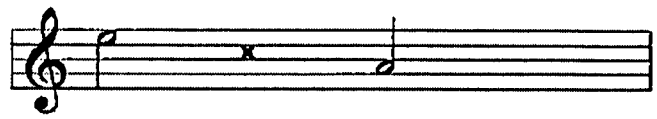
FIG. 6A
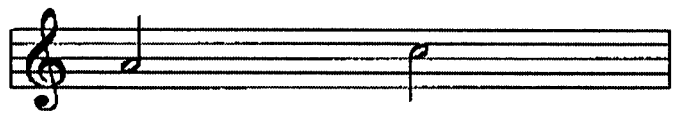
FIG. 6B
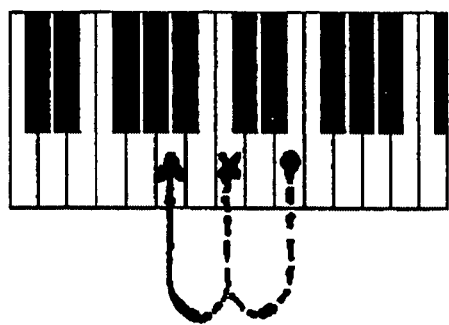 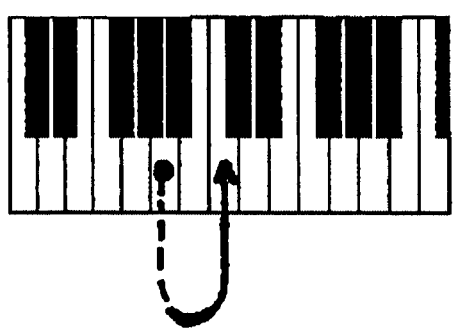
FIG. 6C  FIG. 6D

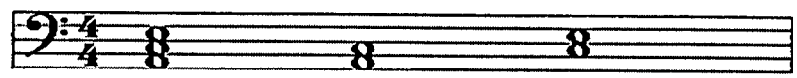
FIG. 12A
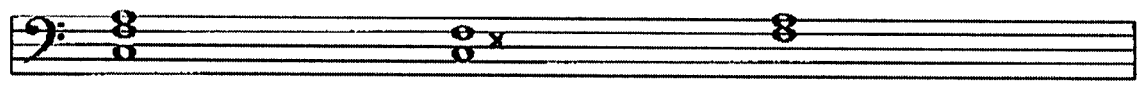
FIG. 12B
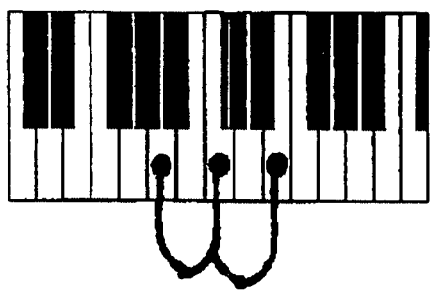 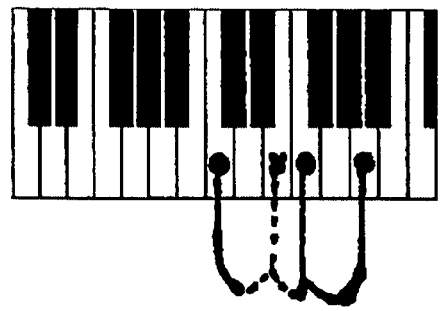
FIG. 12C          FIG. 12D

TINA ILLIG METHOD FOR GOOD PIANO SIGHT READING

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

As a piano teacher of 35 years, I have had difficulty teaching my students to sight read well. Sight reading is playing a new piece on the piano from music notation for the first time. Some students seem to be able to do this fairly well and others do not. The ability seems independent of how many piano lessons they have had. I recently created a concrete way for them to be able to do this and it seems to be successful for all my students. Traditional piano note reading relies on learning notes by letter names and then relating them to the piano. Even though this is the standard and accepted practice and has been for many years, I have discovered that relying on the letter names seems to be detrimental to acquiring good sight reading skills. I have tried many sight reading methods for my students and have not found one that is universally helpful or simple to use. My method is both.

BRIEF SUMMARY OF THE INVENTION

Unlike conventional piano sight reading methods, my method makes use of letter names only when finding the starting location of the beginning of a piano piece. All other notes are found by reading the extra skips between the notes. Instead of learning the letter names, my students did much better when I made sure they did NOT use letter names to read piano music. My method uses the physical act of marking extra skips between the notes and in these examples I will use X's, finding the starting note by use of a note/keyboard chart, and then playing the notes on the piano. Since it can be used at every level of piano playing, this method is progressive, starting with single lines of music and moving onto sharps, flats, chords, and double lines of music. Because of the marking of the extra skips, the student's eye becomes trained to see the spatial relationships between the notes that are essential to good piano sight reading. My method makes treble clef and bass clef equally easy to read. Because musicians have been taught the treble clef lines and spaces from an early age with the saying "every good boy does fine" and the word F-A-C-E, many find bass clef reading difficult because it uses different letter names. Since my method relies on reading the distance and direction of notes and does NOT use letter names, treble and bass clef are read in exactly the same way and one is not more difficult than the other.

BRIEF DESCRIPTION OF THE DRAWINGS

FIG. 1A Step, line to space
FIG. 1B Step, space to line
FIG. 1C Step up, moves right on keyboard, shows FIG. 1A, first measure
FIG. 1D Step down, moves left on keyboard, shows FIG. 1A, second measure
FIG. 2A Skip, line to line
FIG. 2B Skip, space to space
FIG. 2C Skip up, moves right on keyboard, shows FIG. 2A
FIG. 2D Skip down, moves left on keyboard, shows FIG. 2B
FIG. 3A Marking extra skips on lines, treble clef
FIG. 3B. Single skip, not marked
FIG. 3C Play FIG. 3A, extra skips on piano
FIG. 3D Play FIG. 3B, single skip, on piano
FIG. 4 Note/keyboard chart
FIG. 5A Marking extra skips on lines, bass clef
FIG. 5B Single skip, not marked
FIG. 5C Play FIG. 5A, extra skips, on piano
FIG. 5D Play FIG. 5B, single skip, on piano
FIG. 6A Marking extra skips in spaces, treble clef
FIG. 6B Single skip, not marked
FIG. 6C Play FIG. 6A, extra skips, on piano
FIG. 6D Play FIG. 6B, single skip, on piano
FIG. 7A Marking extra skips in spaces, bass clef
FIG. 7B Single skip, not marked
FIG. 7C Play FIG. 7A, extra skips, on piano
FIG. 7D Play FIG. 7B, single skip, on piano
FIG. 8A Left note on line, extra skips marked on lines, treble clef
FIG. 8B Skip plus a step, single skip is marked, treble clef
FIG. 8C Left note in space, extra skips marked in spaces, treble clef
FIG. 8D Skip plus a step, single skip is marked, treble clef
FIG. 8E Play FIG. 8A, extra skips, starting on line note
FIG. 8F Play FIG. 8B, skip plus step, starting on line note
FIG. 8G Play FIG. 8C, extra skips, starting on space note
FIG. 8H Play FIG. 8D, skip plus step, starting on space note
FIG. 9A Left note on line note, extra skips marked on lines, bass clef
FIG. 9B Left note on line, skip plus step, single skip is marked
FIG. 9C Left note in space, extra skips marked in spaces, bass clef
FIG. 9D Left note in space, skip plus step, single skip is marked
FIG. 9E Play FIG. 9A, extra skips plus step, starting on line note
FIG. 9F Play FIG. 9B, skip plus step, starting on line note
FIG. 9G Play FIG. 9C, extra skips, starting on space note
FIG. 9H Play FIG. 9D, skip plus step, starting on space note
FIG. 10A Marking skips between sharped notes
FIG. 10B Play FIG. 10A on piano, ignoring sharps, using marked skip method
FIG. 10C Play FIG. 10A on piano, with sharps, using marked skip method
FIG. 11A Marking skips between flat notes
FIG. 11B Play FIG. 11A on piano, ignoring flats, using marked skip method
FIG. 11C Play FIG. 11A on piano, with flats, using marked skip method
FIG. 12A Marking skips within a chord, same orientation (all spaces)
FIG. 12B Marking skips within a chord, different orientation (lines and spaces)
FIG. 12C Play FIG. 12A, chord, all spaces, all skips, using marked skip method
FIG. 12D Play FIG. 12B, chord, lines and spaces, skips and steps, using marked skip method FIG. 13A Grand staff, mark extra skips between notes on each staff FIG. 13B Play both lines together, using marked skip method, solid line between keyboards indicate the notes that play at the same time

DETAILED DESCRIPTION OF THE INVENTION

This new method of piano sight reading uses the marking of extra skips, in the examples we will use X's, between notes on the musical staff to teach good sight reading. Good sight reading is the ability to play a song from musical notation fairly well the first time you see it. This skill seems to be elusive for many musicians even at high levels of technical proficiency. In my description, I will be using the word piano to include all musical keyboard instruments and percussion mallet instruments with keys.

Over my 35 years of teaching piano I have sought out and used many different sight reading methods with my students. Many are tedious and none of them produced uniformly good results for all students. Every method had in common the fact that they rely on letter names to read the notes. Results were slow and sometimes barely perceptible. They also had in common that they were abstract, for example, many methods have you read one to five new pieces over a certain time period with a preliminary scan of the piece before starting. My method is very concrete. If the musician does the written work and then plays the notes on piano WITHOUT using the accepted practice of thinking of letter names of the notes on the staff, the spatial relationships between the notes become apparent and, as a result, the musician becomes a good sight reader. This teaching method has worked well for me with all levels of piano students.

It is first essential that the student understand the difference between a skip and step on the staff and on the piano. A step on the staff is from a line to an adjacent space in either direction, FIG. 1A, or a space to an adjacent line in either direction, FIG. 1B. This is equivalent to moving to an adjacent white key on the piano. Moving up on the staff will be a move to the right on the keyboard, FIG. 1C. The keyboard drawing shows FIG. 1A, first measure. Moving down on the staff will be a move to the left on the keyboard, FIG. 1D. The keyboard drawing shows FIG. 1A, second measure.

A skip on the staff is from a line to the next line in either direction, FIG. 2A, or a space to the next space in either direction, FIG. 2B. This is equivalent to skipping over a white key on the keyboard. Moving up on the staff will be a move to the right on the keyboard, FIG. 2C. The keyboard drawing shows FIG. 2A. Moving down on the staff will be a move to the left on the keyboard, FIG. 2D. The keyboard drawing shows FIG. 2B The written work begins with notes on the treble staff. These notes are exclusively on lines. The musician marks extra skips between notes on the staff. These markings will be up or down on the staff depending on note placement. Because we are using only line notes, the markings will be only on lines, FIG. 3A. Single skips will have no markings between them, FIG. 3B.

Figure 3A:
Figure 3B:
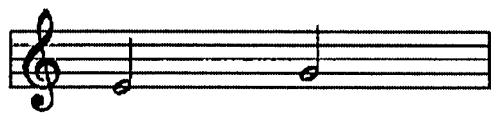
Figure 3C:
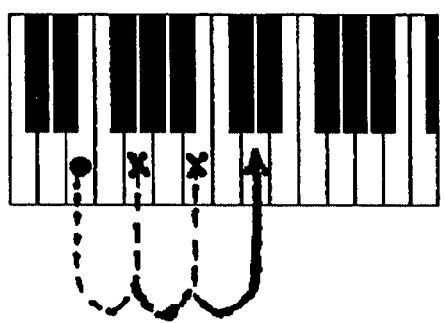
Figure 3D:
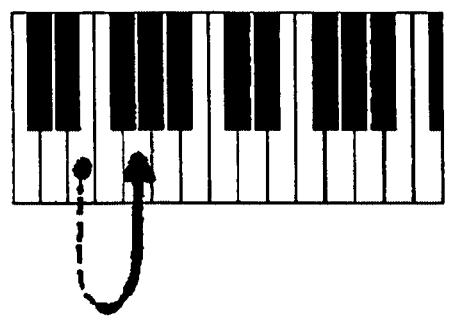
Figure 4:
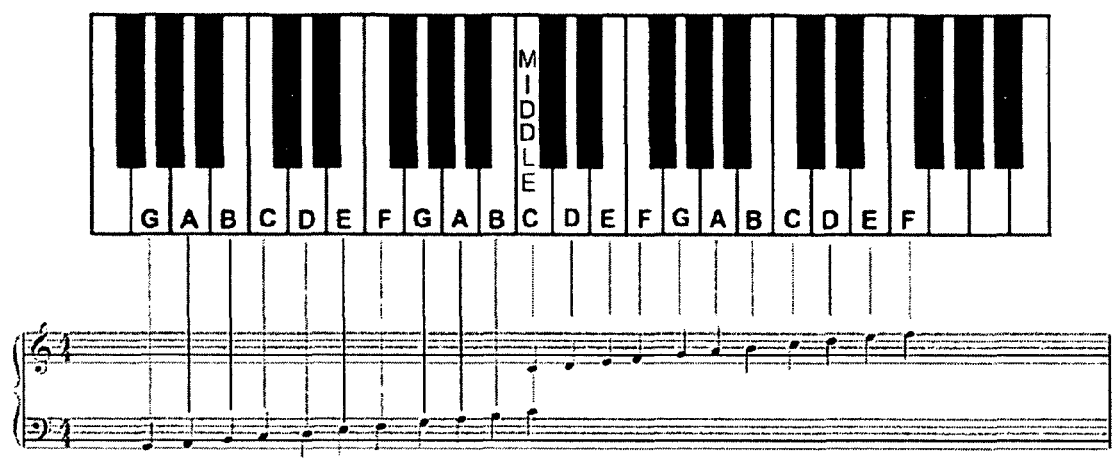

Using a note/keyboard chart, FIG. 4, the musician will find and play the beginning note in FIG. 3A on the piano and then play the succeeding notes by skipping over a white key on the piano every time an extra skip is marked, FIG. 3C. Using a note/keyboard chart, FIG. 4, the musician will find the beginning note in FIG. 3B on the piano and will play the second note by recognizing a line-to-line unmarked skip, FIG. 3D.

Next, the musician will mark extra skips between the notes on the bass staff that are exclusively on lines. Because we are using only line notes, the markings will be only on lines, FIG. 5A. Again, no single skips will be marked, FIG. 5B.

Figure 5A:
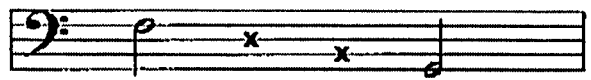
Figure 5B:
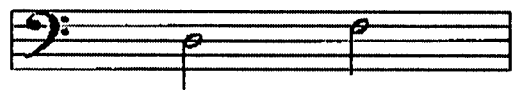
Figure 5C:
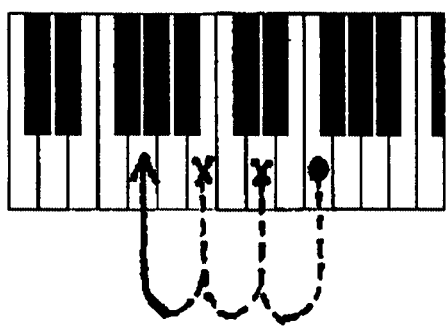
Figure 5D:
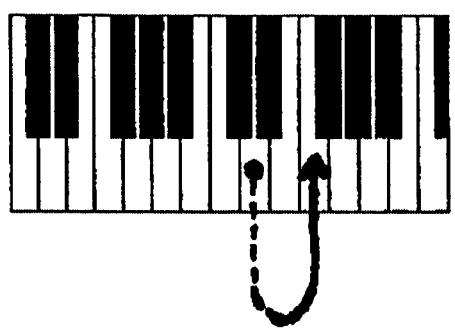

Using a note/keyboard chart, FIG. 4, the musician will find and play the beginning note in FIG. 5A on the piano and then play succeeding notes by skipping over a white key on the piano every time an extra skip is marked, FIG. 5C. Using a note/keyboard chart, FIG. 4, the musician will find the beginning note in FIG. 5B and will play the second note by recognizing a line-to-line unmarked skip, FIG. 5D.

Next, the musician will mark extra skips between the notes on the treble staff that are exclusively in spaces. Because we are using only space notes, the markings will only be in spaces, FIG. 6A. No single skips will be marked, FIG. 6B.

Using a note/keyboard chart, FIG. 4, the musician will find and play the beginning note in FIG. 6A on the piano and then play the succeeding notes by skipping over a white key on the piano every time an extra skip is marked, FIG. 6C. Using a note/keyboard chart, FIG. 4, the musician will find the beginning note in FIG. 6B and will play the second note by recognizing a space-to-space unmarked skip, FIG. 6D.

Next, the musician will mark extra skips between the notes on the bass staff that are exclusively in spaces. Because we are using only space notes, the markings will only be in spaces, FIG. 7A. No single skips will be marked, FIG. 7B.

Figure 7A:
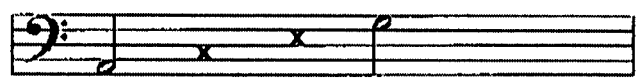
Figure 7B:
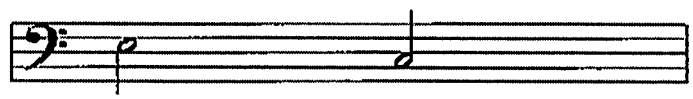
Figure 7C:
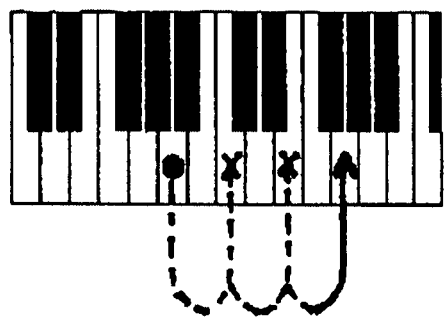
Figure 7D:
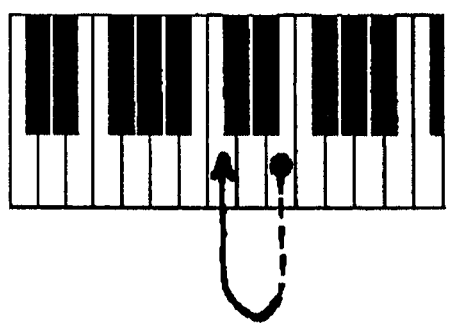

Using a note/keyboard chart, FIG. 4, the musician will find and play the beginning note in FIG. 7A on the piano and then play the succeeding notes by skipping over a white key on the piano every time an extra skip is marked on the staff, FIG. 7C. Using a note/keyboard chart, FIG. 4, the musician will find and play the beginning note in FIG. 7B and will play the second note by recognizing an unmarked space-to-space skip, FIG. 7D.

Figure 8A:
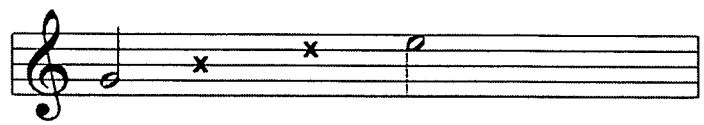
Figure 8B:
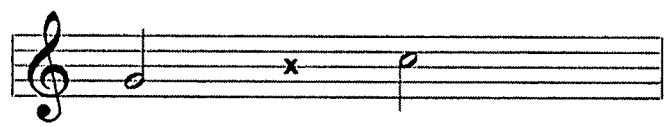
Figure 8C:
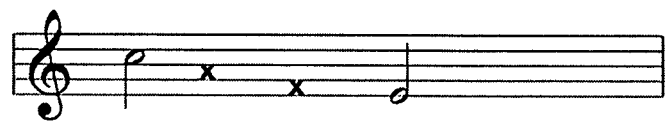
Figure 8D:
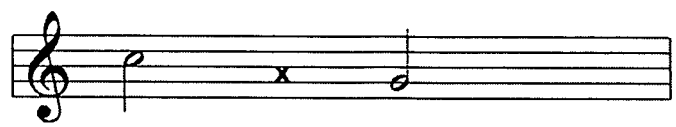
Figure 8E:
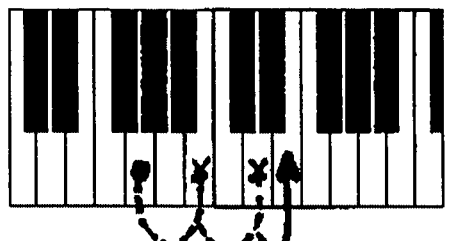
Figure 8G:
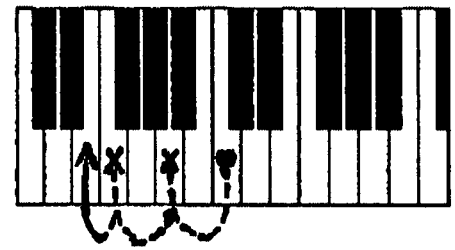
Figure 8F:
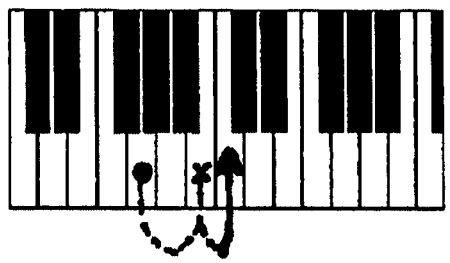
Figure 8H:
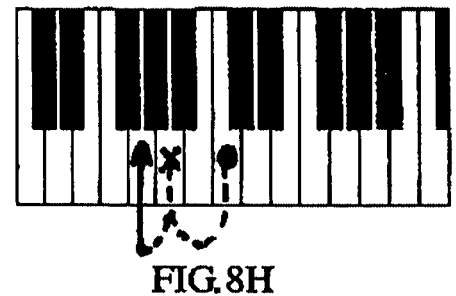

Next, the musician will mark extra skips between the notes on the treble staff. The notes will be on both lines and spaces. To mark these, the musician must look at the orientation of the left note of the two notes being marked. If the left note is on a line, the extra skips will be marked on lines, FIG. 8A. If the spacing between the notes is a single skip plus a step, reference section [0003] and FIG. 1A for definition of step, the single skip must be marked, FIG. 8B. If the left note is in a space, the extra skips will be marked in spaces, FIG. 8C. If the spacing is a single skip plus a step, the single skip must be marked, FIG. 8D.

Using a note/keyboard chart, FIG. 4, the musician will find and play the beginning note of each example on the piano and then play the succeeding notes by skipping over a white key on the piano every time a skip is marked. The musician will then move to the adjacent piano key if there is a step after the skips, FIG. 8E, FIG. 8F, FIG. 8G, FIG. 8H.

Figure 9A:
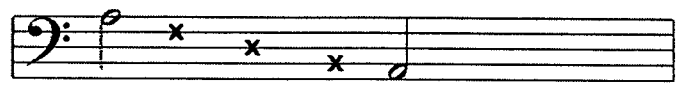
Figure 9B:
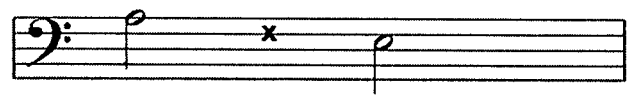
Figure 9C:
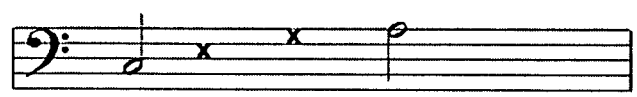
Figure 9D:
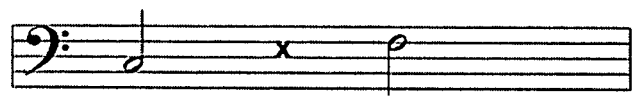
Figure 9E:
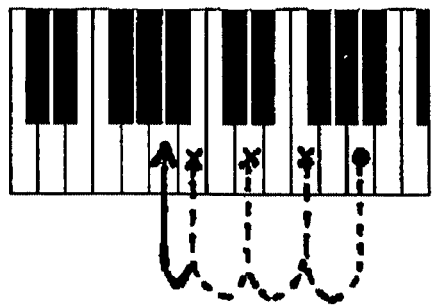
Figure 9F:
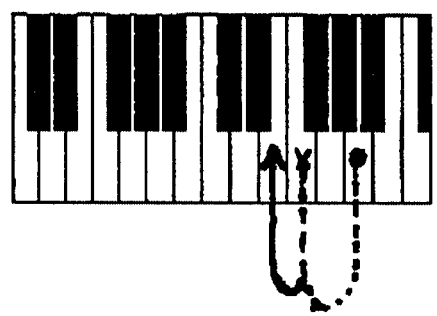
Figure 9G:
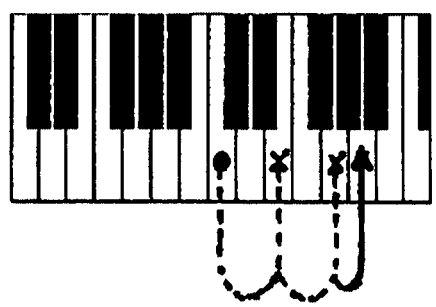
Figure 9H:
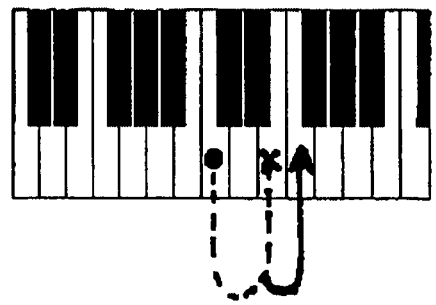

Next, the musician will mark extra skips between the notes on the bass staff. The notes will be on both lines and spaces. To mark these, the musician must look at the orientation of the left note of the two notes being marked. If the left note is on a line, the extra skips will be marked on lines, FIG. 9A. If the spacing between the notes is a single skip plus a step, the single skip must be marked, FIG. 9B. If the left note is in a space, the extra skips will be marked in spaces, FIG. 9C. If the spacing is a single skip plus a step, the single skip must be marked, FIG. 9D.

Using a note/keyboard chart, FIG. 4, the musician will find and play the beginning note of each example on the piano and then play succeeding notes by skipping over a white key on the piano every time a skip is marked. The musician will then move to the adjacent piano key if there is a step after the skips, FIG. 9E, FIG. 9F, FIG. 9G, FIG. 9H.

Figure 10A:
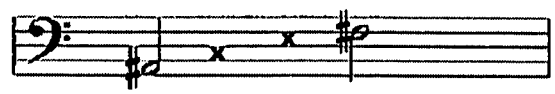

After thoroughly practicing marking skips and playing them on the piano the musician will apply the method to sharps. A sharp is indicated with the symbol, #, and indicates that the musician will play the very next key, either black or white, to the right of the note. The musician should mark the skips between the notes using the same instruction given for notes without sharps, FIG. 10A.

Figure 10B:
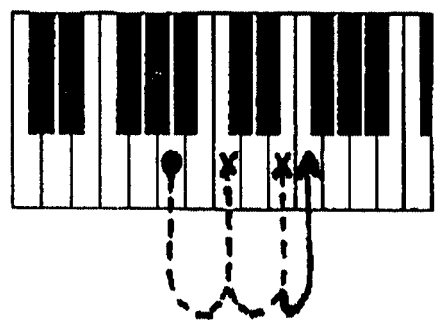
Figure 10C:

Using a note/keyboard chart, FIG. 4, the musician will find and play the beginning note on the piano while ignoring the sharp and then play the successive note also ignoring the sharp, FIG. 10B. Then the musician will play the notes on the piano using the sharps for both, which moves each note to the very next key to the right, either white or black, FIG. 10C.

Figure 11A:
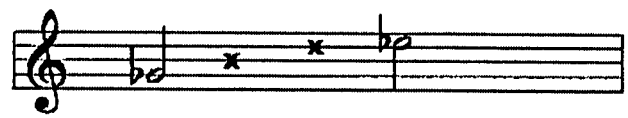

Next, the musician will apply the method to flats. A flat uses the symbol, b, and indicates that the musician will play the very next key, either black or white, to the left of the note. The musician should mark the skips between the notes using the same instruction given for notes without flats, FIG. 11A.

Figure 11B:
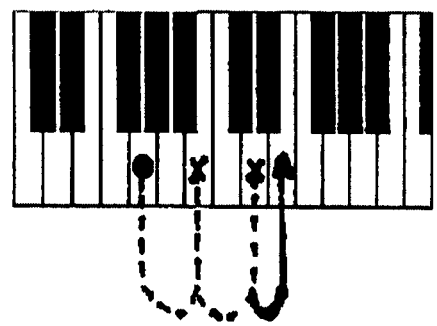
Figure 11C:

Using a note/keyboard chart, FIG. 4, the musician will find and play the beginning note on the piano while ignoring the flat and then play the successive note also ignoring the flat, FIG. 11B. Then the musician will play the notes on the piano using the flats for both, which moves each note to the very next key to the left, either white or black, FIG. 11C.

The musician will next apply the method to chords by marking extra skips between the notes of the chord and by recognizing single skips between the notes of the chord. In FIG. 12A, the musician will recognize adjacent space notes in the chord as single skips, so nothing will be marked between the notes. In FIG. 12B the musician will mark the skip between the bottom note and the middle note, using the rules of the marked skip method. The middle note to the top note will not be marked because it is a single skip.

Using a note/keyboard chart, FIG. 4, the musician will find and play the bottom note of the chord in FIG. 12A and then find the rest of the notes by recognizing single skips, FIG. 12C. Using a note/keyboard chart, FIG. 4, the musician will find and play the bottom note of the chord in FIG. 12B and then find the rest of the notes by using the marked skip method, FIG. 12D.

Figure 13A:

The musician will next apply the method to grand staff notation. The grand staff uses 2 single staffs put together with the top staff using treble clef and the bottom staff using bass clef. The musician will mark the extra skips on the treble clef line and then mark the extra skips on the bass clef line, FIG. 13A.

Figure 13B:
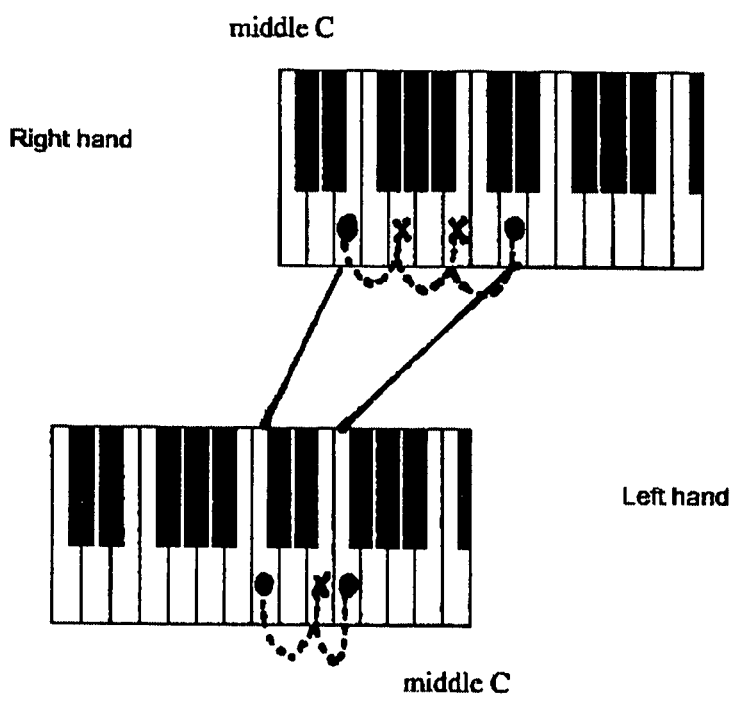

Using a note/keyboard chart, FIG. 4, the musician will find the beginning note on each staff and proceed to play them together. Treble clef staff notes will be played with right hand and bass clef staff notes will be played with left hand. The musician will find the next two notes through use of the rules of the marked skip method and play them together, FIG. 13B. The top keyboard in FIG. 13B shows the right hand notes and the bottom keyboard shows the left hand notes. Solid lines between the keyboards indicate when notes play together.

This method applies perfectly to notes that are on ledger lines. A ledger line is a small line above or below the staff that extends the staff so that higher or lower notes can be written and played. The skips would be marked in the exact same way as described above. Note: The musician will recognize that if the starting note has the same orientation, line or space, as the next note, the marking of skips will always end with a skip. If the starting note has a different orientation, line or space, than the next note, the marking of skips will always end with a single adjacent step.

The invention claimed is:

1. A method of piano sight reading, where sight reading is playing a piece of music for the first time, wherein the method seeks to improve speed and accuracy of a first reading, wherein the method excludes traditional use of letter names except for finding beginning note locations through use of a one page referential note/keyboard chart, and that by a repeated physical act of marking of extra skips and then translating to physically playing notes on the piano, trains eye to hand connection that is essential to reading and playing music faster and more accurately, wherein piano includes an electronic keyboard or percussion mallet instruments with keys, wherein the steps of the method are:
    a. Physically mark the extra skips between each two successive notes on a staff, using a graphic representation
    b. Find a starting location for a first note by using a one page referential note/keyboard chart
    c. Place a hand or mallet on the instrument in a location that was found and the first note is played/sounded
    d. The hand or mallet next skips over a key on the instrument in succession, for each extra skip that has been marked on the music between the two notes, then moves to and plays the next written note
    e. Starting with the note just played, the process is then repeated from letter (d) with each successive note.

2. The method as in claim 1 wherein the method:
uses traditional staff notation,
has only one type of physical marking—the physical marking of the skips between notes,
wherein the method further uses a series of writing/playing exercises in the following order:
    a. Marking and playing extra skips between treble clef line notes
    b. Marking and playing extra skips between bass clef line notes
    c. Marking and playing extra skips between treble clef space notes
    d. Marking and playing extra skips between bass clef space notes
    e. Marking and playing extra skips between treble clef notes of different orientation, where a note orientation is a position of a note on a staff relating to a space or line
    f. Marking and playing extra skips between bass clef notes of different orientation
    g. Marking and playing extra skips between treble clef combined line, and space note
    h. Marking and playing extra skips between bass clef combined line, and space notes.

3. The method as in claim 1 wherein the method, progressively moves to more complex exercises in the following order:
    a. Using the method to mark extra skips on a single staff with single notes
    b. Using the method to mark extra skips on two staves, treble and bass, each with single notes, but to be played together
    c. Using the method to mark extra skips on music with accidentals, where accidentals are notation on a staff before a note that will raise or lower the note, music with accidentals uses the exact same physical marking process as music without accidentals, after finding where to play a note through the process, the sounded note will be played by raising it or lowering it according to which accidental is present—exercises using accidentals will follow the same progression as non-accidental exercises
    d. Using the method to mark extra skips on two staves, treble and bass, each with chords having double or triple notes to be played together;

Wherein the method further makes all lines and spaces nameless by excluding letter names, and so renders the staff lines and spaces neutral in treble clef, bass clef, and ledger lines, making the treble clef, bass clef, and ledger line notes equally easy to read.

* * * * *